United States Patent Office 2,819,249
Patented Jan. 7, 1958

2,819,249

PRESERVED RUBBER

John C. Petropoulos, South Norwalk, Frank A. V. Sullivan, Glenbrook, and Arthur C. Lindaw, Norwalk, Conn., assignors to American Cyanamid Company, New York, N. Y., a corporation of Maine No Drawing. Application March 25, 1955
Serial No. 496,936

6 Claims. (Cl. 260—45.95)

This invention relates to new antioxidants. More particularly, it is concerned with a novel group of dihydric phenols used as non-discoloring antioxidants in the manufacture of rubber products. Still more specifically, the rubber antioxidants employed in the present invention are a novel class of phenols represented by the formula:

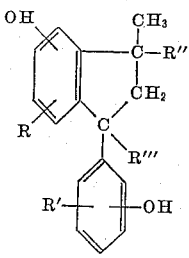

in which R and R' are H or a lower alkyl group containing 1 to 4 carbon atoms; R'' and R''' are lower alkyl groups containing 1 to 4 carbon atoms.

An object of this invention is to provide a new class of dihydric phenol antioxidants for natural and synthetic rubbers which are subject to deterioration under the action of heat, light and/or oxygen-bearing gas. Among such rubbers are included pale crepe, rubber-like homopolymers of butadiene-1,3 and substituted butadienes, and rubbery copolymers of the same with aryl olefins such as styrene, with acrylic compounds such as acrylonitrile, methyl acrylate and methyl methacrylate, as well as with isobutylene, methyl vinyl ether, mono-vinyl pyridines, vinylidene chloride and the like. Accordingly, the term "a rubber" refers to natural and synthetic rubbers of which butadiene-styrene (GR–S), butadiene-acrylonitrile (GR–A), and neoprene are illustrative.

The novel diphenols of the present invention are prepared by dimerizing a compound having the general formula:

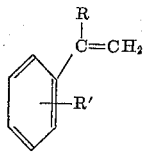

wherein R is an alkyl group containing from 1 to 4 carbon atoms, and R' is H, or an alkyl group containing from 1 to 4 carbon atoms to form a dimer having the general formula:

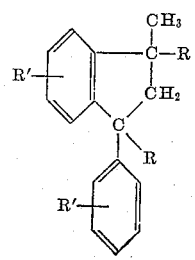

in which R and R' having the same meanings as above. The dimer thus produced is sulfonated by reacting said dimer with sulfuric acid, sulfur trioxide or a mixture of sulfur trioxide and sulfur dioxide and the like to form the sulfonated derivative of the dimer. The sulfonated product thus produced is salted out of solution by use of a suitable salting agent and recovering the sulfonated product from solution. The sulfonated product is then reacted in a fusion step with an alkaline material such as potassium hydroxide to produce the novel diphenols of the present invention.

The starting materials utilized in the preparation of the diphenols of the present invention are substituted styrenes having an alkyl group containing from 1 to 4 carbon atoms in the alpha position, and no substituent on the ring or an alkyl group having 1–4 carbon atoms on the ring. The alkyl group in the alpha position may be any one of methyl, ethyl, propyl, and butyl. The propyl group may be either n-propyl or isopropyl and the butyl group may be either n-butyl, isobutyl or tertiary butyl. One may use, for instance, α-methylstyrene, α-ethylstyrene, α-propylstyrene, α-butylstyrene and the like. The alkyl substituent on the ring may be in either the ortho, meta or para position. Representative of the class of alkyl substituted styrenes which may be used in practice are α,o-dimethylstyrene, α,m-dimethylstyrene, α,p-dimethylstyrene, α-ethyl, o-methylstyrene, α-ethyl, m-methylstyrene, α-ethyl, p-ethylstyrene, α-propyl, o-propylstyrene, α-propyl, m-butylstyrene, α-propyl, p-methylstyrene, α-butyl, o-methylstyrene, α-butyl, m-ethylstyrene, α-butyl, p-methylstyrene and the like. The alkyl substituent on the ring containing from 1 to 4 carbon atoms may be the sole substituent on the ring or it may be accompanied by other substituents, such as other alkyl groups containing from 1 to 4 carbon atoms such as α-methyl, 2,4-dimethylstyrene, α-methyl, 2-t. butyl, 4-methylstyrene, and the like. In order that the process for the preparation of the dimers utilized in the practice of the process of the present invention may be more readily understood, the following illustrative dimerizations are set forth in which all parts are parts by weight unless otherwise indicated. These dimerizations are set forth primarily for the purpose of illustration and any specific enumeration of detail contained therein should not be construed as a limitation except as indicated in the appended claims.

DIMERIZATION OF α,p-DIMETHYLSTYRENE 800 parts of toluene cooled to 5° C. are introduced into a suitable reaction vessel. To the toluene, there is added 140 parts of a 95% sulfuric acid. The mixture is stirred thoroughly and maintained at a temperature of about 0–5° C. To the cooled mixture, there is added 260 parts of α,p-dimethylstyrene dissolved in 200 parts of toluene. The resulting mixture is allowed to react for ½ hour at 0–5° C. and is then hydrolyzed with 120 parts of water. The organic layer is washed free of acidic material with water and is distilled to yield 250 parts of a colorless oil having a boiling point of 142–144° C. at 0.8 mm. This oil solidifies and has a melting point of 37–38° C. uncorrected.

DIMERIZATION OF α-ETHYL,
p-METHLYSTYRENE

To 400 parts of toluene at 5° C., there is added slowly 70 parts of 95% sulfuric acid followed by 144 parts of α-ethyl, p-methylstyrene dissolved in 100 parts of toluene. The temperature is maintained at 0–10° C. during the entire addition. The resulting mixture is allowed to react for ½ hour and then is hydrolyzed with 100 parts of water. The organic material is collected, washed free of acidic material with water and distilled to yield 130 parts of a colorless liquid having a boiling point of 160–

165° C. at 1 mm. 1-(4-methylphenyl)-1,3-diethyl-3,6 dimethyl-indane is produced.

DIMERIZATION OF α, META-DIMETHYLSTYRENE

To 200 parts of toluene at 0–5° C., there is added slowly 35 parts of 95% sulfuric acid, 65 parts of α, m-dimethylstyrene dissolved in 50 parts of toluene. The resulting mixture is allowed to react for about ½ hour and is then hydrolyzed with water. The organic material is collected, washed and distilled to yield 61 parts of a colorless liquid having a boiling point of 144–148° C. at 1 mm. pressure. 1-(3-methylphenyl)-1,3,3,5 tetramethyl-indane is produced.

DIMERIZATION OF CRUDE α, p-DIMETHYLSTYRENE

To 368 parts of toluene at 10° C., there is added slowly 50 parts of anhydrous aluminum chloride followed by 516 parts of crude (undistilled) α, p-dimethylstyrene dissolved in 368 parts of toluene while maintaining the temperature below 10° C. After a 20 minute reaction time, the mixture is hydrolyzed with water and the organic layer is collected and dried. The organic material is distilled to give 150 parts of a colorless oil having a boiling point of 138–140° C. at 0.5–1 mm. 1-(4-methylphenyl)-1,3,3,6 tetramethyl-indane is produced.

DIMERIZATION OF α, p-DIMETHYLSTYRENE

A mixture of 310 parts of freshly distilled α, p-dimethylstyrene and 2 parts of p-toluene sulfonic acid are heated in a steam bath for about 16 hours and then allowed to react at room temperature for 2½ months, at which time the p-toluene sulfonic acid catalyst is removed by washing the organic layer with dilute sodium bicarbonate solution. Distillation of the organic layer gave 151 parts of a very light yellow colored oil having a boiling point of 136–140° C. at 1 mm. pressure. 1-(4-methylphenyl)-1,3,3,6 tetramethyl-indane is produced.

Use of these, and similar dimers, in preparing the dihydric phenols of the present invention are shown in the following examples, which again are intended as illustrative and not by way of limitation. Again all parts are by weight unless otherwise noted.

*Example 1.—Preparation of 1-(3-hydroxy-4-methyl-phenyl-1,3,3,6-tetramethyl-5-indanol*

Into a suitable reaction vessel equipped with thermometer and stirrer, there is introduced 250 parts of 1-(4-methylphenyl)-1,3,3,6-tetramethyl-indane. The charge is heated to about 50° C. and there is slowly added 450 parts of fuming sulfuric acid (15–18%). The reaction mixture is raised to about 100° C. at which time it is cooled and poured into a mixture of 1000 parts of concentrated hydrochloric acid and 500 parts of water. On cooling, needle-like crystals appear and are collected. The disulfonic acid crystals thus produced melt at about 100–104° C. and have a neutral equivalent of 239, indicating that the acid crystallizes with two molecules of water. The diacid produced had the probable structure:

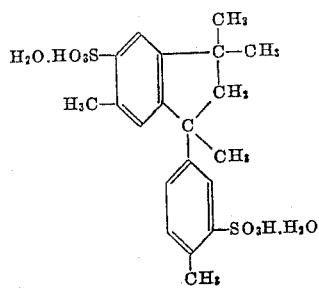

Into a suitable reaction vessel, there is introduced 700 parts of potassium hydroxide and 17 parts of water and the mixture is heated to about 300° C., whereupon there is added slowly 175 parts of the sulfonated product hereinabove produced. Some sulfur dioxide gas is evolved. The mixture is stirred and allowed to react further for about 1–2 hours at 325–340° C. After cooling, the fused mass is dissolved in water and acidified with hydrochloric acid causing a solid to precipitate. The solid material is collected and washed several times with a sodium bicarbonate solution which removed substantially all of the acid impurities. A crude diphenol having a melting point of 173° C. is obtained in an 80% yield and is further purified by recrystallization from methanol and water. This purification caused the melting point to raise to 178° C. The analysis calculated for $C_{20}H_{24}O_2$: was C, 81.04; H, 8.16, OH, 11.48. Found: C, 80.95; H, 8.12; OH, 11.46. The probable structure of the diphenol is as follows:

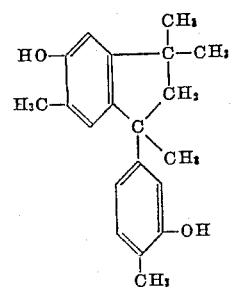

In carrying out the sulfonation step of the dimer of alpha methyl para methylstyrene, it is possible to operate under a rather wide range of temperatures such as between about 0° C. and 100° C. but preferably between about 15° C. and 50° C. In the salting out step, it is desired to utilize as low a temperature as possible while still in a liquid phase such as temperatures between about 0° C. and 30° C. As salting out agents, one can use in addition to hydrochloric acid, hydrobromic acid, sodium chloride, barium hydroxide and the like.

*Example 2.—Preparation of 1-(4-hydroxy-3-methyl-phenyl)-1,3,3,5-tetramethyl-6-indanol*

To 200 parts of fuming sulfuric acid (15–18%), there is added slowly 100 parts of 1-(3-methylphenyl)-1,3,3,5-tetramethylindane. The temperature is controlled so as not to exceed about 30° C. by cooling on a water bath. At the end of the addition, the mixture is allowed to react for an additional ½ hour and then is added to concentrated hydrochloric acid solution. The disulfonic acid derivative which precipitates is cooled, washed free from sulfonic acid with hydrochloric acid and is dried. To 400 parts of potassium hydroxide maintained at 300° C., there is added slowly 100 parts of the disulfonic acid derivative thus produced. After the addition is completed, the temperature is raised to and maintained at 325° C. for ½ hour. After cooling, the mixture is dissolved in water and neutralized with Dry Ice. The diphenol thus produced is collected and purirfied by crystallization from heptane.

*Example 3.—Preparation of 1-(4-hydroxyphenyl)-1,3,3-trimethyl-5-indanol*

To 105 parts of fuming sulfuric acid (15–18%), there is added 50 parts of 1-(phenyl)-1,3,3,-trimethylindane. The temperature is elevated to about 40° C. and controlled at that temperature by cooling on a water bath. At the end of the addition, the reaction is permitted to continue for an additional 30 minutes and the reaction mixture is then poured into concentrated hydrochloric acid. The disulfonic acid thus produced is precipitated, collected and washed free from sulfuric acid by the use of hydrochloric acid. The washed disulfonic acid is then dried. Into a separate reaction vessel equipped with thermometer, stirrer, and reflux condenser, there is introduced 300 parts of sodium hydroxide which is then heated to about 300° C. and to this charge, there is added slowly about 100 parts of the disulfonic acid thus produced. When the addition is completed, the temperature is raised to and maintained at about 325° C. for 30 minutes. After cooling, the reaction mixture is dissolved in water and neutralized with solid carbon dioxide. The 1-(4-hydroxyphenyl)-1,3,3,-trimethyl-5-indanol which forms is collected and purified by crystallization from a methanol/water solution.

*Example 4.—Preparation of 1-(3-hydroxy-4-methylphenyl) 1,3-diethyl-3,6-dimethyl-5-indanol*

Into a suitable reaction vessel equipped with thermometer, and stirrer, there is introduced 90 parts of fuming sulfuric acid (15–18%) and there is added thereto at a slow rate, 50 parts of 1-(4-methylphenyl)-1,3,-diethyl-3,6-dimethyl-indane. The temperature is elevated to about 70° C. and maintained at that temperature after the addition is completed for approximately ½ hour. The reaction mixture is then poured into a solution of concentrated hydrochloric acid. The disulfonic acid thus produced is collected after precipitation, washed free from sulfuric acid with hydrochloric acid, and is then dried. Into a separate reaction vessel equipped as indicated hereinabove, there is introduced 600 parts of potassium hydroxide which is heated to 325–335° C. While at this temperature, there is added slowly to the sphere of reaction 100 parts of disulfonic acid thus produced. After the addition is completed, the temperature is maintained at about 335° C. for ½ hour. The mixture is then cooled, dissolved in water and neutralized. The 1-(3-hydroxy-4-methylphenyl)-1,3,-diethyl-3,6-dimethyl-5-indanol is collected and purified by crystallization from heptane.

*Example 5.—Preparation of 1-(4-hydroxy-3-methylphenyl)-1,3-diethyl-3,5-dimethyl-6-indanol*

Into a suitable reaction vessel equipped as in Example 1, there is introduced 90 parts of fuming sulfuric acid and 50 parts of 1-(3-methylphenyl)-1,3-diethyl-3,5-dimethylindane. The temperature is prevented from exceeding 30° C. by cooling on a water bath. At the end of the addition, the mixture is allowed to react for an additional ½ hour and is then poured into concentrated hydrochloric acid. The disulfonic acid thus produced is precipitated, collected and washed with hydrochloric acid in order to eliminate the sulfuric acid, and is then dried. To a suitable reaction vessel equipped with thermometer, stirrer and reflux condenser, there is added 650 parts of potassium hydroxide and the temperature is raised to about 310–330° C. To the sphere of reaction, there is added slowly 100 parts of the disulfonic acid thus produced. After the addition is completed, the reaction is permitted to continue at the same temperature for about ½ hour whereupon the reaction mixture is cooled, dissolved in water and neutralized with Dry Ice. The 1-(4-hydroxy-3-methylphenyl)-1,3-diethyl-3,5-dimethyl-6-indanol is collected and purified by crystallization from heptane.

*Example 6.—Preparation of 1-(4-hydroxyphenyl)-1,3-diethyl-3-methyl-5-indanol*

Into a suitable reaction vessel, 100 parts of fuming sulfuric acid (15–18%) are introduced and to the sphere of reaction, there is added slowly 50 parts of 1-(phenyl)-1,3-diethyl-3-methylindane. The temperature is raised to about 40° C. and is maintained at that temperature after the addition has been completed and is permitted to react for an additional 30 minutes. Thereupon, the charge is poured into concentrated hydrochloric acid and the sulfonic acid which precipitated is collected and washed free from sulfuric acid and is dried. Into a suitable reaction vessel equipped with stirrer, thermometer and reflux condenser, there is introduced 400 parts of potassium hydroxide and 300 parts of sodium hydroxide. When the temperature of the charge has been raised to 320–330° C.,
there is added slowly 100 parts of the disulfonic acid thus produced. After the addition is completed, the reaction mixture is maintained at about 330° C. for ½ hour. The mixture is then cooled, dissolved in water and neutralized with Dry Ice. The 1-(4-hydroxyphenyl)-1,3-diethyl-3-methyl-5-indanol is collected and purified by crystallization from a methanol/water mixture.

Among the dihydric phenols which may be prepared in accordance with the process of the present invention are:

1 - (3 - hydroxy - 4 - methylphenyl) - 1,3,3,6 - tetramethyl-5-indanol
1 - (2 - hydroxy - 4 - methylphenyl) - 1,3,3,6 - tetramethyl-4-indanol
1 - (3 - hydroxy - 4 - methylphenyl) - 1,3,3,6 - tetramethyl-7-indanol
1 - (2 - hydroxyphenyl) - 1,3,3,-trimethyl-5-indanol
1 - (3 - hydroxyphenyl)-1,3,3,-trimethyl-5-indanol
1 - (4 - hydroxyphenyl) - 1,3,3,-trimethyl-5-indanol
1 - (3 - hydroxy - 4 - ethylphenyl) - 6 - ethyl - 1,3,3,-trimethyl-5-indanol
1 - (3 - hydroxy - 4 - ethylphenyl) - 1,3,6-triethyl - 3 - methyl-5-indanol
1 - (3 - hydroxy - 4 - propylphenyl) - 3 - methyl - 1,3,6 - tripropyl-5-indanol
1 - (3 - hydroxy - 4 - butylphenyl) - 1,3,6 - tributyl - 3 - methyl-5-indanol
1 - (4 - hydroxy - 3 - ethylphenyl) - 1,3,6 - triethyl - 3 - methyl-5-indanol
1 - (4 - hydroxy - 3 - propylphenyl) - 1,3,6 - tripropyl - 3-methyl-5-indanol
1 - (2 - tert. butyl-3-hydroxy-4-methylphenyl)-1,3,3,6-trimethyl-4-tert. butyl-5-indanol To prepare the dihydric phenols of the present invention, one may alternatively ring chlorinate the indanes and hydrolyze the chlorinated indanes to produce the corresponding indanols, or by any other suitable method.

It is an advantage of the present invention that no particular precautions need be taken in making use of these compounds. The antioxidants may be handled in any of the customary ways.

The antioxidants need not be used in more than the customary amounts due to their high activity. Amounts ranging from about 0.25 to about 2.5 pounds per hundred pounds of rubber in the formulation give good results. If necessary this range may be extended in either direction but for most purposes, however, it will be adequate to utilize an even narrower average range of about 0.5–1.5 pounds per 100 pounds of rubber.

Utilization of the antioxidant materials of the present invention may be realized in a number of different ways. The antioxidant may be combined with the other materials in the normal manner of compounding. It may be added at any stage in the compounding, although it is added generally early. In addition, the antioxidant materials are soluble in rubber and are particularly advantageous for use in certain other methods which are sometimes used. The antioxidants may be dissolved in a suitable solvent and sprayed or painted on the rubber. An aromatic hydrocarbon solvent such benzene or toluene, which will penetrate rubber and evaporate, should be used. Rubber articles may also be preserved by dipping the product in a suitable solution of the antioxidant.

In the present application, the aging qualities of rubber were tested by two of the most commonly used methods. The first is the modified Geer Oven Test also known as a Cell Oven Test. In the other, the Bierer and Davis Oxygen Bomb Test was employed.

The determination of the aging effect in the Geer Oven Test is determined by finding the change in the physical properties of the vulcanized composition after certain periods of exposure, usually 24 to 168 hours or more in a hot oven at a temperature in the range of 70°–100° C.

In the Oxygen Oven Test, the aging effect is determined by measuring the change in physical properties of the vulcanized composition after several definite periods of exposure at temperatures in the bomb of 70°–80° C. under 300 pounds p. s. i. oxygen pressure. Both methods are well known to the rubber technologist.

In order to illustrate the utilization of the new antioxidants in the present invention, a number of formulations were prepared. For illustrative purposes the new compound of Example 1 was chosen for testing as an antioxidant in natural rubber. A masterbatch was mixed and then divided as shown below.

MASTERBATCH

| | |
|---|---:|
| Pale crepe | 100 |
| Natural calcium carbonate | 40 |
| Precipitated calcium carbonate | 30 |
| Titanium dioxide | 25 |
| Zinc oxide | 5 |
| Stearic acid | 2 |
| Sulfur | 2.85 |
| Mercaptobenzothiazyl disulfide | 1.25 |
| | 206.10 |

| | A | B |
|---|---|---|
| Masterbatch | 206.1 | 206.1 |
| Product of Ex. 1 | | 1.0 |

The above stocks were vulcanized by curing for 10, 15, 25, 40 and 50 minutes at 141° C. The 25 minute cure is approximately optimum for the composition and test samples cured 25 minutes at 141° C. were used in the examples below.

*Example 7*

The original tensile of the above stocks was measured. The samples were next exposed in the Cell Oven Test for 44 hours at 100° C. and the tensile strength was again measured. For purposes of comparison, the original and after-treatment tensile strengths, as well as the percent of the original strength retained, are shown. The best results are indicated by the highest retention of tensile strength after treatment. Test results are shown in the following table:

TABLE 1

| | Original Tensile Strength, Pounds Sq. In. | Final Tensile Strength, Pounds Sq. In. | Percent Original Tensile Strength Retained |
|---|---|---|---|
| Sample A | 2,375 | 950 | 40 |
| Sample B | 2,425 | 1,450 | 60 |

From the foregoing test, the clear superiority of the composition containing the compound of Example 1 is clearly indicated. This is confirmed by the results obtained in the oxygen bomb test, as shown in the following example.

*Example 8*

The procedure of Example 7 was repeated on another portion of the same rubber, except that aging was carried out in a Bierer and Davis Oxygen Bomb. An exposure period of 120 hours at 70° C. and 300 pounds per square inch of oxygen pressure was used. These results are shown in Table II.

TABLE II

| | Original Tensile Strength, Pounds Sq. In. | Final Tensile Strength, Pounds Sq. In. | Percent Original Tensile Strength Retained |
|---|---|---|---|
| Sample A | 2,375 | 700 | 29 |
| Sample B | 2,425 | 1,850 | 76 |

From the above data, it is clear that a 2½ fold increase in tensile is retained, even after subjecting the rubber samples to drastic oxidation conditions.

*Example 9*

In another more convenient and precise method for ascertaining the relative performance of antioxidants is the "Hot Creep" test in which deformation, after a time period when loaded under temperature, is measured. One such procedure is the Throdahl method described in "Industrial and Engineering Chemistry," volume 40, No. 11, pages 2180–2184, November 1948. The lowest percentage of creep indicates the best aging. A modification of this method was used to study the comparative effectiveness of the class of compounds herein described, selecting the antioxidant of Example 1 (1,3,3,6-tetramethyl-1-[3-hydroxy-4-methylphenyl]-5-indanol), as illustrative. As indicated above, the rubber and antioxidant sample is identified as sample B. However, in this test, standard dumb-bell tensile strength specimens are used. The data is presented in Table III, below.

TABLE III

| | Percent of "Creep" after 44 hours at 100°C. with 50 p. s. i. load | Percent of "Creep" after 66 hours at 100°C. with 50 p. s. i. load |
|---|---|---|
| Sample A | 40.2 | Failed |
| Sample B | 12.3 | 16.5 |

It is clear as the data reveals that after 44 hours the antioxidant of the present invention has retained substantially its original resistance, whereas the sample A containing no antioxidant is in a poor condition. After 66 hours, sample A failed by forming an unmeasureable rubbery blob, whereas sample A with antioxidant maintained its original resistance, though slightly less than the same sample after 44 hours.

*Example 10*

To observe any discoloration of sample B due to light, cured sheets of sample A and sample B were exposed for 34 days to indoor light. It was observed that sample B did not discolor as compared to sample A.

We claim:

1. A vulcanized rubber composition containing a rubber selected from the group consisting of natural rubber and a synthetic butadiene and from about 0.25 to about 2.5 pounds per 100 pounds of said rubber of a compound of the formula:

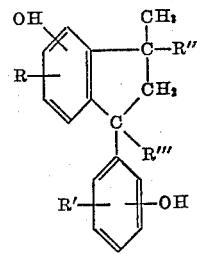

in which R and R' are selected from the group consisting of H and a lower alkyl group while R" and R"' represent lower alkyl groups, characterized by a marked lowering of the rate of oxidation from the rate for a similar composition from which the compound is omitted.

2. A vulcanized rubber composition containing a rubber selected from the group consisting of natural rubber and a synthetic butadiene and from about 0.25 to about 2.5 pounds per 100 pounds of said rubber of a compound of the formula:

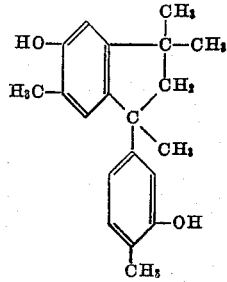

characterized by a marked lowering of the rate of oxidation from the rate for a similar composition from which the compound is omitted.

3. A method of reducing the rate of oxidation of a vulcanized rubber composition with substantially no increase in its susceptibility to discoloration in light, which comprises combining with a vulcanizable rubber composition containing a rubber selected from the group consisting of natural rubber and a synthetic butadiene type rubber from about 0.25 to about 2.5 pounds per 100 pounds of said rubber of a compound of the formula:

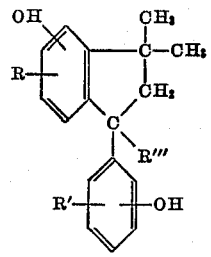

in which R and R' are selected from the group consisting of H and a lower alkyl group, while R" and R'" represent lower alkyl groups, and vulcanazing said composition.

4. A method of reducing the rate of oxidation of a vulcanized rubber composition with substantially no increase in its susceptibility to discoloration in light, which comprises combining with a vulcanizable rubber composition containing a rubber selected from the group consisting of natural rubber and a synthetic butadiene type rubber from about 0.25 to about 2.5 pounds per 100 pounds of said rubber of a compound of the formula:

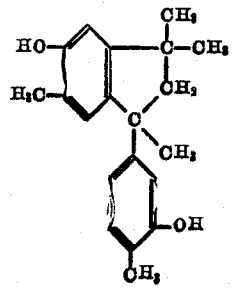

and vulcanizing said composition.

5. An unvulcanized vulcanizable rubber composition containing a rubber selected from the group consisting of natural rubber and a synthetic butadiene type rubber and from about 0.25 to about 2.5 pounds per 100 pounds of said rubber of a compound of the formula:

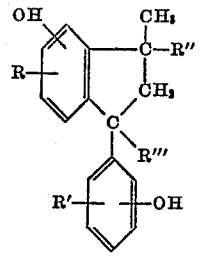

in which R and R' are selected from the group consisting of H and a lower alkyl group while R" and R'" represent lower alkyl groups, characterized by a marked lowering of the rate of oxidation from the rate for a similar composition from which the compound is omitted.

6. An unvulcanized rubber composition containing a rubber selected from the group consisting of natural rubber and a synthetic butadiene and from about 0.25 to about 2.5 pounds per 100 pounds of said rubber of a compound of the formula:

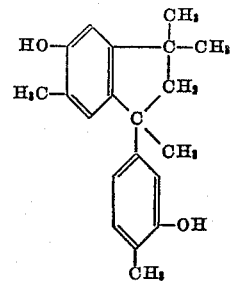

characterized by a marked lowering of the rate of oxidation from the rate for a similar composition from which the compound is omitted.

References Cited in the file of this patent
UNITED STATES PATENTS

| | | |
|---|---|---|
| 1,842,989 | Kropp et al. | Jan. 26, 1932 |
| 2,176,881 | Burroughs | Oct. 24, 1939 |
| 2,754,285 | Petropoulos | July 10, 1956 |